US011665185B2

United States Patent
Herley et al.

(10) Patent No.: US 11,665,185 B2
(45) Date of Patent: May 30, 2023

(54) METHOD AND APPARATUS TO DETECT SCRIPTED NETWORK TRAFFIC

(71) Applicant: Microsoft Technology Licensing, LLC, Redmond, WA (US)

(72) Inventors: Cormac Herley, Bellevue, WA (US); Fang Tu, Shoreline, WA (US); Cheng Cao, Sammamish, WA (US); Jayadev Pillai, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 305 days.

(21) Appl. No.: 16/909,869

(22) Filed: Jun. 23, 2020

(65) Prior Publication Data

US 2021/0400065 A1    Dec. 23, 2021

(51) Int. Cl.
*H04L 9/40* (2022.01)
*H04L 43/16* (2022.01)

(52) U.S. Cl.
CPC .......... *H04L 63/1425* (2013.01); *H04L 43/16* (2013.01); *H04L 63/0236* (2013.01); *H04L 63/1416* (2013.01); *H04L 63/1466* (2013.01); *H04L 63/168* (2013.01); *H04L 63/20* (2013.01); *H04L 2463/144* (2013.01)

(58) Field of Classification Search
CPC . H04L 63/1425; H04L 63/16; H04L 63/0236; H04L 63/1416; H04L 63/168; H04L 63/20; H04L 2463/144; H04L 63/1441; G06N 20/00
See application file for complete search history.

(56) References Cited

U.S. PATENT DOCUMENTS

| 7,886,046 B1 * | 2/2011 | Zeitoun | H04L 41/145 706/56 |
| 10,594,711 B2 * | 3/2020 | Levin | H04L 63/1425 |
| 10,785,318 B2 * | 9/2020 | Dhamnani | H04L 63/1416 |

(Continued)

OTHER PUBLICATIONS

Chen et al. "Exploring a Service-Based Normal Behavior Profiling System for OTNET Detection" IEEE , Jul. 24, 2017 (Year: 2017).*

(Continued)

*Primary Examiner* — Ponnoreay Pich
*Assistant Examiner* — Mudasiru K Olaegbe
(74) *Attorney, Agent, or Firm* — Ray Quinnney & Nebeker P.C.; Adam K. Richards

(57) ABSTRACT

A bot traffic detection system detects scripted network traffic. The bot traffic detection system may use a one-sided unsupervised machine learning technique to estimate distributions for human, non-scripted traffic (clean distributions). The clean distributions may be dynamically updated based on the latest traffic patterns. To estimate the clean distributions the bot traffic detection system may identify, for a certain subset of network traffic, feature values of the certain subset of network traffic that do not include bot traffic (clean buckets). Using clean traffic may provide more robust and stable behavior that can be tracked over time. Using the clean distributions, the bot traffic detection system may generate a rules table that indicates a likelihood that network traffic with a given combination of feature values is scripted network traffic. The bot traffic detection system may apply the rules table in real time to identify scripted network traffic.

18 Claims, 6 Drawing Sheets

(56) References Cited

U.S. PATENT DOCUMENTS

| | | | |
|---|---|---|---|
| 2011/0208714 A1* | 8/2011 | Soukal | H04L 63/1425 707/E17.108 |
| 2012/0071131 A1* | 3/2012 | Zisapel | H04L 63/1408 455/410 |
| 2016/0028754 A1* | 1/2016 | Cruz Mota | H04L 63/1458 726/23 |
| 2017/0302686 A1* | 10/2017 | Medvedovsky | H04L 63/1458 |
| 2018/0077179 A1* | 3/2018 | Zhang | H04L 63/1425 |
| 2018/0108015 A1* | 4/2018 | Rogas | H04L 61/4552 |
| 2018/0108051 A1* | 4/2018 | Rygiel | G06Q 50/167 |
| 2018/0343280 A1* | 11/2018 | McQueen | H04L 63/08 |
| 2020/0382535 A1* | 12/2020 | Herley | H04L 67/02 |

OTHER PUBLICATIONS

Microsoft Computer Dictionary, 5th Edition. Microsoft press. p. 93. (Year: 2002).*

Bressan, et al., "On the Selection and Classification of Independent Features", In Journal of IEEE Transactions on Pattern Analysis and Machine Intelligence, vol. 25, Issue 10, Oct. 2003, pp. 1312-1317.

Chen, et al., "Exploring a Service-Based Normal Behaviour Profiling System for Botnet Detection", In Proceedings of IFIP/IEEE Symposium on Integrated Network and Service Management, May 8, 2017, pp. 947-952.

"International Search Report and Written Opinion Issued in PCT Application No. PCT/US21/032679", dated Sep. 1, 2021, 11 Pages.

Song, et al., "Toward a more Practical Unsupervised Anomaly Detection System", In Journal of Information Sciences vol. 231, May 10, 2013, pp. 4-14.

Herley, et al., "Distinguishing Attacks from Legitimate Authentication Traffic at Scale", In Proceedings of Network and Distributed Systems Security (NDSS) Symposium, Feb. 24, 2019, pp. 1-13.

\* cited by examiner

METHOD AND APPARATUS TO DETECT SCRIPTED NETWORK TRAFFIC

CROSS-REFERENCE TO RELATED APPLICATIONS

N/A

BACKGROUND

Users may use a browser installed on a computing device to access a website through the Internet. The users may interact with content on the website during a session. The website may be intended for human users and may allow users to create an account with an associated password. Bot traffic may be non-human network traffic to the website. Software applications or scripts running automated tasks may generate and control bot traffic. Bots may perform repetitive tasks and do so at a rate much faster than humans could. Although some bots may facilitate useful services (such as search engines and website monitoring), other bots may be malicious or, at the very least, a nuisance. For example, a bot may target a website or server and overwhelm it with traffic sufficient to crash the website. As another example, bots may perform online guessing attacks against password servers. Some estimates suggest that approximately 50% of online traffic results from bots. Because of the possible negative impacts of bot traffic, online service providers seek to detect and reject bot traffic, while minimizing the impact on the intended human users.

SUMMARY

In accordance with one aspect of the present disclosure, a method is disclosed for detecting bot traffic. The method includes accessing a set of conditional independence relationships. A conditional independence relationship describes a set of features that are independent of a separate feature conditioned on a subset feature. The method also includes identifying clean buckets within network traffic data using the set of conditional independence relationships. The network traffic data includes values for features of network traffic and the values for the features are categorized into buckets. The method also includes determining clean distributions using the clean buckets and detecting the bot traffic based on the clean distributions.

The method may also include obtaining the values for the features of the network traffic through device fingerprinting.

The features of the network traffic may include geo-location information, session information, browser information, and network information.

The features of the network traffic may include one or more of a browser version, a browser family, a country, a state, a city, an autonomous system number, a session start time, a number of network hops, or browser user agent languages.

The method may further include determining the set of conditional independence relationships.

The method may further include quantizing the values for the features of the network traffic.

Identifying the clean buckets within the network traffic data using the set of conditional independence relationships may include selecting a first conditional independence relationship from the set of conditional independence relationships, selecting a value for a subset feature of the first conditional independence relationship, and selecting a feature from the set of features. Identifying the clean buckets within the network traffic data using the set of conditional independence relationships may also include, conditioned on the value for the subset feature, identifying buckets within the feature whose distributions have a difference or divergence below a threshold.

Identifying the clean buckets within the network traffic data using the set of conditional independence relationships may also include determining the similarity of two or more buckets within the feature using a divergence measure.

The divergence measure may be Kullback-Leibler divergence.

Determining the clean distributions using the clean buckets may include selecting a conditional independence relationship from the set of conditional independence relationships and selecting a value for a subset feature of the conditional independence relationship. Determining the clean distributions using the clean buckets may also include determining, for each clean bucket of an independent feature of the conditional independent relationship, a distribution of the independent feature conditioned on the value for the subset feature. Determining the clean distributions using the clean buckets may also include determining a median of distributions determined for each clean bucket.

Detecting the bot traffic based on the clean distributions may include determining odds ratios based on the clean distributions and observed network traffic, generating a rules table based on the odds ratios, and identifying an entry in the rules table associated with a session. The entry may have an associated score. Detecting the bot traffic based on the clean distributions may also include comparing the associated score to a threshold.

In accordance with another aspect of the present disclosure, a system is disclosed for detecting bot traffic. The system includes one or more processors, memory in electronic communication with the one or more processors, and data stored in the memory. The data includes values for features of network traffic and the values for the features categorized into buckets. The system also includes instructions stored in the memory. The instructions are executable by the one or more processors to access a set of conditional independence relationships. A conditional independence relationship describes a set of features that are independent of a separate feature conditioned on a subset feature. The instructions are also executable by the one or more processors to identify clean buckets within network traffic data using the set of conditional independence relationships. The network traffic data includes values for features of network traffic and the values for the features are categorized into buckets. The instructions are also executable by the one or more processors to determine clean distributions using the clean buckets. The instructions are also executable by the one or more processors to detect the bot traffic based on the clean distributions.

The instructions stored in memory may be executable by the one or more processors to obtain the values for the features of the network traffic through device fingerprinting.

The features of the network traffic may include geo-location information, session information, browser information, and network information.

The instructions stored in memory that are executable by the one or more processors to identify the clean buckets within the network traffic data using the set of conditional independence relationships may be further executable by the one or more processors to select a conditional independence relationship from the set of conditional independence relationships, select a value for a subset feature of the conditional independence relationship, and select a feature from the set of features. The instructions may also be further executable by the one or more processors to, conditioned on the value for the subset feature, identify buckets within the feature whose distributions have a similarity above a threshold.

The similarity of two or more buckets within the feature may be determined using a divergence measure.

The instructions stored in memory that are executable by the one or more processors to determine the clean distributions using the clean buckets may be further executable by the one or more processors to select a conditional independence relationship from the set of conditional independence relationships and select a value for a subset feature of the conditional independence relationship. The instructions may also be further executable by the one or more processors to determine, for each clean bucket of an independent feature of the conditional independent relationship, a distribution of the independent feature conditioned on the value for the subset feature. The instructions may also be further executable by the one or more processors to determine a median of distributions determined for each clean bucket.

The instructions stored in memory that are executable by the one or more processors to detect the bot traffic based on the clean distributions may be further executable by the one or more processors to determine odds ratios based on the clean distributions and observed network traffic, generate a rules table based on the odds ratios, and identify an entry in the rules table associated with a session. The entry may have an associated score. The instructions may also be executable by the one or more processors to compare the associated score to a threshold.

In accordance with one aspect of the present disclosure, a computer-readable medium is disclosed that includes instructions that are executable by one or more processors to cause a computing system to select a conditional independence relationship from a set of conditional independence relationships. The conditional independence relationship describes a set of features that, conditioned on a subset feature, are independent of a separate feature. The instructions are also executable by one or more processors to select a value for the subset feature and select a feature from the set of features. The instructions are also executable by one or more processors to, conditioned on the value for the subset feature, identify buckets within the feature whose distributions have a similarity above a threshold.

The similarity of two or more buckets within the feature may be determined using a divergence measure.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
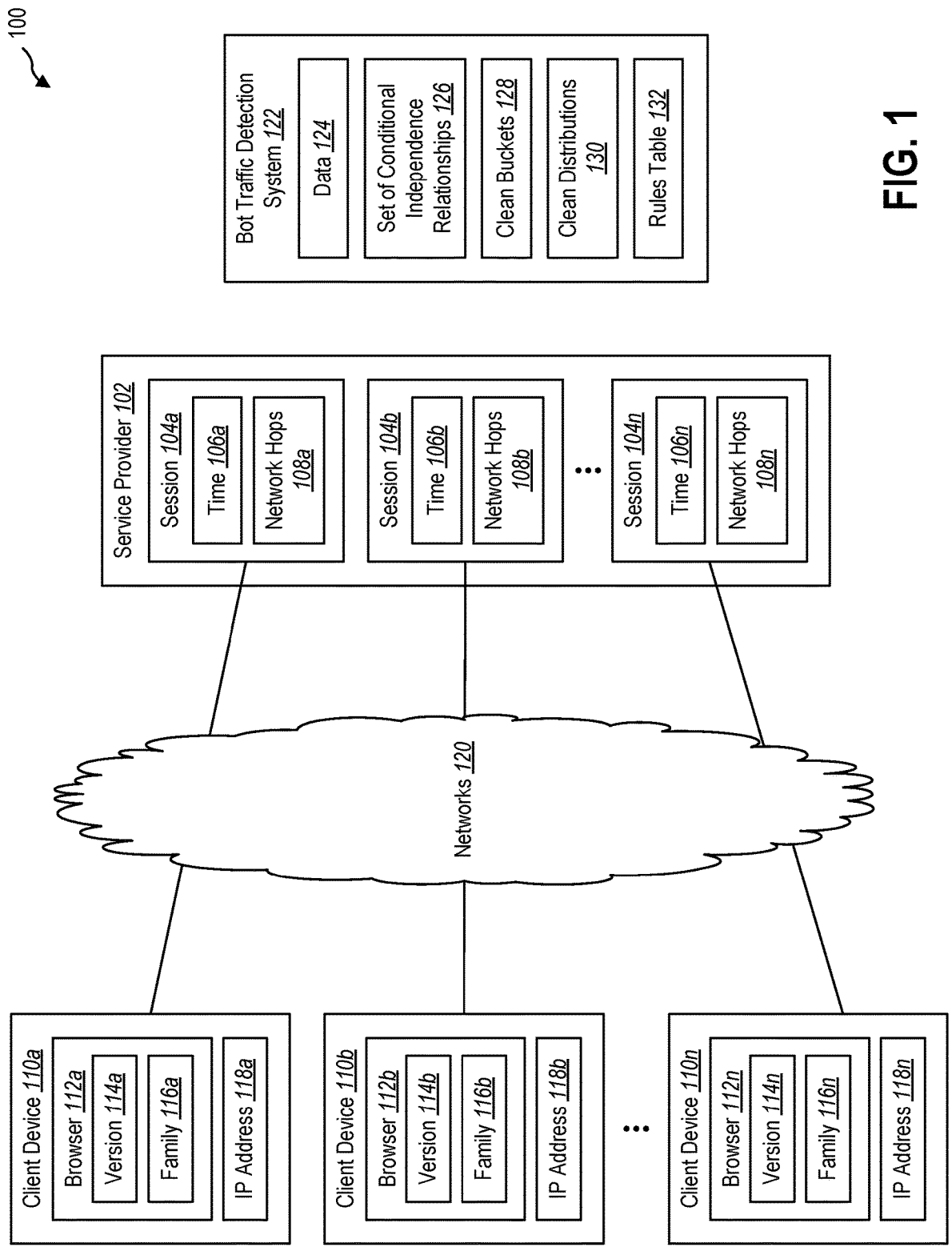
FIG. 1 illustrates an example system for detecting scripted network traffic.

This disclosure concerns methods and systems for detecting scripted network traffic (which may be referred to as "bot" traffic). The disclosed methods and systems use a one-sided unsupervised machine learning technique to estimate distributions for human, non-scripted traffic, which may be referred to as clean distributions. The methods and systems may use the clean distributions to generate rules that can be applied in real time to determine a likelihood that incoming network traffic is scripted traffic.

Bot traffic may be any non-human network traffic to a resource accessible through a network, such as a website, app, or online service. Software applications or scripts running automated tasks may generate and control bot traffic. Bots may perform repetitive tasks and do so at a rate much faster than humans could. Although some bots facilitate useful services (such as search engines and website monitoring), other bots are malicious or, at the very least, a nuisance. For example, a bot may target a website or server and overwhelm it with traffic sufficient to crash the website. As another example, bots may perform online guessing attacks against password servers. Some estimates suggest that approximately 50% of online traffic results from bots. Because of the possible negative impacts of bot traffic, online service providers may benefit from tools that detect and reject bot traffic.

But detecting bot traffic presents challenges. Decisions about bot traffic must be made quickly, meaning that any detection method must operate with low latency. Although machine learning models may be one option for making fast decisions, the absence of labeled training data and the non-stationarity of attack traffic make it challenging to apply machine learning techniques. In some problems, there are ground truth labels that apply to a set of inputs. Those example-label pairs may be used to train models to make judgments about unlabeled data. For example, a machine learning model may be designed to predict the age of a consumer based on the goods the person has purchased. Such a model may be trained on data that includes examples of actual purchases along with the actual age of the purchaser. But in the field of bot detection, service providers do not know whether past traffic resulted from humans or bots. Service providers may make guesses about the source of traffic but do not have definitive answers. And even if service providers could label past data, bot traffic is constantly changing and moving. Supervised machine learning models may have difficulty keeping up because they are stationary based on training frequency.

This disclosure presents a bot traffic detection system that uses an unsupervised machine learning approach to detect bot traffic. The bot traffic detection system may use a one-sided approach. But instead of focusing on identifying bot traffic for training, the bot traffic detection system may identify human traffic to determine clean distributions. Clean distributions may be distributions of non-scripted traffic. Using clean traffic may provide more robust and stable behavior that can be tracked over time. The bot traffic detection system may compare the clean distributions to the latest traffic patterns to generate a precomputed probability table that can be applied in real time (i.e., with low latency) to distinguish between human and bot traffic. The bot traffic detection system may accept or reject incoming traffic based on the precomputed probability table. The bot traffic detection system may dynamically update the clean distributions based on the latest traffic patterns.

The bot traffic detection system may use data gathered about network traffic to build an unsupervised machine learning model. An online service provider may receive network traffic. Incoming network traffic may generate one or more sessions. Each session initiated at the online service provider may have one or more characteristics that describe the session. For example, the session may have started at a particular time, been initiated by a browser that belongs to a particular browser family or has a particular browser version, or been initiated from a particular country, state, or city. As another example, the network traffic for the session may have travelled on a certain number of networks to reach the online service provider (i.e., made a certain number of network hops). These characteristics may be referred to as features. Stated another way, a feature of network traffic session may be a measurable or identifiable characteristic of or related to the network traffic session. Network traffic features may include geo-location information, session information, network information, and browser information.

The bot traffic detection system may gather information related to only a subset of available features. Gathering feature values may be part of device fingerprinting. Device fingerprinting may be done in multiple steps. To reduce latency the bot traffic detection system may rely on features obtained during a first step of device fingerprinting. Adding features from later steps of device fingerprinting may increase the detection rate but also increase latency.

Traffic features may have categorical values. A feature with categorical values (which may be referred to as a categorical feature) may be a feature defined by a discrete set of categories. As one example, the browser family of the browser that initiated a network session may be a categorical feature. There may be a discrete number of browser families (such as Edge, Chrome, FireFox, etc.) to which the browser may belong.

Traffic features may have continuous or near continuous values. A feature with continuous values (which may be referred to as a continuous feature) may be a feature whose value is measured on a range of continuous or near-continuous values. For example, the time a browser session started may be a continuous feature. As another example, the longitude and latitude of a session may be a continuous feature. A continuous feature may be a measured using discrete values but the number of discrete values may be extremely large. For example, the IP address of the device that initiated a session may be a continuous feature.

To make feature data more useful the bot traffic detection system may quantize feature values. Quantizing feature values may include defining a discrete number of buckets for a feature. A certain set or range of feature values may map to each bucket. For example, consider source IP address of traffic to be a feature of the traffic. There may be trillions of possible IP addresses. The bot traffic detection system may map IP addresses that belong to a particular network autonomous system number (ASN) to a single bucket. As a result, the IP address feature may be reduced from trillions of possible values to far fewer buckets. As another example, consider a connection time to be a feature of the traffic. The system may group connection times by hour of day. As a result, the connection time of a browser session may belong to one of 24 different buckets based on the hour of day when the browser session connected to the system. Using buckets to categorize feature values may reduce the dimension of the input space and make the data more useful for analysis.

The bot traffic detection system may determine or include a set of conditional independence relationships. The set of conditional independence relationships may describe features that are conditionally independent of each other. A conditional independence relationship may take the following form: $x_j$ independent of $\{x_k\}|S_i$. That is, $x_j$ is independent of each $x_k$ within the subset $S_i$. The set $\{x_k\}$ may be a set of features and $x_j$ may be a feature not contained in the set $\{x_k\}$. $S_i$ may be a subset of the data. The subset of the data may be sessions that have a particular feature value or that belong to a particular feature bucket. For example, the independence relationship may be conditioned on the data being associated with a particular country or a particular browser family or their intersection (e.g., a particular country and a particular browser family). If $x_j$ is independent of $\{x_k\}|S_i$, then the following holds: $P(x_j, x_k|S_i) = P(x_j|S_i) * P(x_k|S_i)$ for every $x_k$ in $\{x_k\}$. An example of a conditional independence relationship may be the following: the browser versions for a set of traffic sessions is independent of the state, country, or city of the set of traffic sessions conditioned on the set of traffic sessions having been initiated by a browser belonging to a particular browser family.

The bot traffic detection system may identify clean buckets of feature $x_k$. Clean buckets may be referred to as un-attacked buckets or buckets that have not been attacked by bot traffic or that contain little attack traffic relative to the amount of legitimate traffic. The feature $x_k$ may include multiple buckets. Assume that the feature $x_k$ has only three buckets. Those buckets may be referred to as $x_k(0)$, $x_k(1)$, and $x_k(2)$. To identify clean buckets the bot traffic detection system may look for buckets of $x_k$ that have approximately equal distributions for one or more features $x_j|S_i$. For example, the bot traffic detection system may observe that $P(x_j|S_i, x_k(0)) \approx P(x_j|S_i, x_k(1))$. As a result, the bot traffic detection system may determine that buckets $x_k(0)$ and $x_k(1)$ are clean buckets. A collection of un-attacked buckets may be referred to as the set $u(x_k)$.

The bot traffic detection system may use the set of conditional independence relationships to identify clean buckets of feature $x_k$. The system may use a brute-force search, a sampled search, or other method to find buckets that have approximately equal distribution for one or more features $x_j|S_i$. To determine whether buckets have approximately equal distributions, the bot traffic detection system may use a particular divergence measure, such as the Kullback-Leibler (KL) divergence, and set a particular threshold. Buckets that have a divergence measure below the particular threshold may be determined to have approximately equal distributions.

After identifying clean buckets, the bot traffic detection system may further confirm the identity of clean buckets by comparing distributions on an independent feature of clean buckets across multiple different features. If multiple buckets from different features (e.g., for a selected country, several cities, a few ASNs, and a couple network hop counts) are showing almost identical distributions on an independent feature (e.g., traffic volume among major browser versions originated from the country), the bot traffic detection system may determine that these buckets have little to no bot traffic and are therefore clean buckets. It may be highly unlikely that bots can mimic the exact same traffic pattern as normal users across multiple features. In other words, it may be highly unlikely that bots can spread traffic across different cities, ASNs, and network hops in identical browser version distribution as human traffic. Furthermore, the bots do not know the dimensions along which the bot traffic detection system is slicing network traffic.

The features $x_j$ may include features that may normally be collected from a web-client connection and things that might be derived from them. Such features may include browser version, browser family, and OS version, which may be derived from a user agent. Such features may also include country, metro region, and location, which may be derived from an IP address. Such features may also include hour-of-day, which may be derived from a timestamp. They might also include features that can be used to fingerprint a client's device and browser, such as local time set on client's device, number of network hops to go from server to the client's device, count of fonts available on the client's device, a list of user agent languages used by the browser, screen resolution, and count of plugins available on the browser. Such device and browser fingerprinting features may be collected through running JavaScript on a client's device. The device and browser fingerprinting features may be combined with web-client connection features.

The bot traffic detection system may use the clean buckets to estimate clean distributions: $P(x_j|\text{clean},S_i) \approx P(x_j|S_i, u(x_k))$. The clean distributions may represent a distribution of non-scripted traffic for feature $x_j$ conditioned on $S_i$. The bot traffic detection system may calculate likelihood rules for each possible tuple of the categorical features: $\text{Odds}(x|S_i) = (P(x|S_i) - a*\text{Prod\_j } P(x_j|S_i, u(x_k)))/a*\text{Prod\_j } P(x_j|S_i, u(x_k))$. The likelihood rules may represent a likelihood that a given combination of feature values or feature buckets is scripted traffic. The value a in the calculation of $\text{Odds}(x|S_i)$ represents the estimated fraction of the traffic in subset $S_i$ that is legitimate. This value can be estimated or a default value can be used. Since a does not affect the ordering of values of $\text{Odds}(x|S_i)$ (i.e., if $\text{Odds}(x|S_i) > \text{Odds}(y|S_i)$ is true for any value of a it is true for every value of a), a ranking of tuples from most to least suspicious can be computed using a default or expected value of a (e.g., a=0.5).

The bot traffic detection system may apply the likelihood rules in real time to incoming network traffic to determine a likelihood that the incoming network traffic is scripted. The bot traffic detection system may compare the likelihood that the incoming network traffic is scripted to a threshold. If the likelihood that the incoming network traffic is scripted meets or exceeds the threshold, the bot traffic detection system may reject the network traffic.

The system may calculate several different sets of rules to incorporate information from features that are not independent. For example, metro region and ASN may be dependent. The system may calculate one set of rules using metro and another using ASN and classify something as anomalous if it looks anomalous with respect to either set of rules.

The bot traffic detection system may allow online service providers to better distinguish between scripted traffic and human traffic.

FIG. 1 illustrates an example system 100 for detecting bot traffic.

The system 100 may include a service provider 102. Although FIG. 1 shows only the service provider 102, the system 100 may include multiple service providers. The service provider 102 may be a collection of computing devices or resources that can be accessed remotely. For example, the service provider 102 may be a cloud-computing system, a website, or an app. The service provider 102 may provide access to content or services owned by the service provider 102 or by a third party.

Client devices 110a-n may be computing devices capable of accessing a network. The client devices 110a-n may be controlled by users. The client devices 110a-n may access the service provider 102 using networks 120. The networks 120 may allow the client devices 110a-n to access the service provider 102 remotely. The networks 120 may include one or more internet service providers (ISPs) and other networks.

The client devices 110a-n may include browsers 112a-n and have IP addresses 118a-n. The browsers 112a-n may be software applications used to access information on the Internet. Human users of the client devices 110a-n may use the browsers 112a-n to view and interact with content provided by the service provider 102. An automated script (such as a bot) may control the browsers 112a-n. The browsers 112a-n may belong to families 116a-n and have versions 114a-n. The families 116a-n may represent categories of browser types. For example, the families 116a-n may include Microsoft Edge, Chrome, Firefox, and Safari. The versions 114a-n may represent which of multiple possible versions the browsers 112a-n are. For example, within the Chrome family, there may be many different versions of Chrome, such as Chrome 78.0, Chrome 79.0, and Chrome 80.0.

The client devices 110a-n may initiate connections with the service provider 102. Connecting with the service provider 102 may result in sessions 104a-n. A session initiated by a bot may be scripted network traffic. Each of the sessions 104a-n may be associated with the client devices 110a-n. Although FIG. 1 shows only one session 104a-n for each client device 110a-n, the client devices 110a-n may initiate multiple different sessions with the service provider 102. The sessions 104a-n may include times 106a-n that represent times of day the client devices 110a-n connected with the service provider 102 to begin the sessions 104a-n.

When the client devices 110a-n initiate the connections with the service provider 102, the service provider 102 may receive or obtain information about the client devices 110a-n. The service provider 102 may obtain information about the browsers 112a-n (including the families 116a-n and the versions 114a-n). The service provider 102 may obtain the IP addresses 118a-n. The service provider 102 may obtain information about a number of network hops 108a-n required for each client device 110a-n to reach the service provider 102. The service provider 102 may obtain other information about the browsers 112a-n or the client devices 110a-n not shown on FIG. 1. For example, the service provider 102 may obtain information about browser user agent languages and fonts count.

The service provider 102 may derive additional information based on the information received or obtained from the client devices 110a-n. For example, the service provider 102 may derive location information for the client devices 110*a-n* based on the IP addresses 118*a-n*. This location information may include a country, state, and city for each client device 110*a-n*. As another example, the service provider 102 may derive ASNs from the IP addresses 118*a-n*.

The system 100 may include a bot traffic detection system 122. The bot traffic detection system 122 may receive information about the sessions 104*a-n* and the client devices 110*a-n* from the service provider 102. In the alternative, the service provider 102 may include the bot traffic detection system 122. The bot traffic detection system 122 may store the information about the sessions 104*a-n* and the client devices 110*a-n* as data 124. The data 124 may store information about sessions from a particular time period. The data 124 may include information about sessions at multiple service providers.

Each session 104*a-n* may have one or more characteristics that may be referred to as features. The features may describe the sessions 104*a-n* or the client devices 110*a-n*. For example, the version 114*a* of the browser 112*a* may be a feature of the session 104*a*. As another example, the time 106*b* that the client device 110*b* initiated the session 104*b* may be a feature of the session 104*b*. As another example, the city where the client device 110*n* is located when it initiates the session 104*n* (which may be derived from the IP address 118*n*) may be a feature of the session 104*n*. The data 124 may store feature values for one or more features of the sessions 104*a-n*.

The features of the sessions 104*a-n* may be categorical features. Categorical features may be features that can be defined using a discrete number of categories. For example, browser family may be a categorical feature because there may be a limited number of browser families to which the browsers 112*a-n* may belong. Non-categorical features may be features that may be measured along a continuous or near continuous spectrum. For example, the time a session begins may be a non-categorical feature because it may be measured on the continuous spectrum of time.

The bot traffic detection system 122 may manipulate or modify the data 124 received from the service provider 102 to facilitate analyzing the data 124. The bot traffic detection system 122 may categorize (which may also be referred to as quantize) the data 124. In particular, the bot traffic detection system 122 may define buckets for features included in the data 124 and map each feature value to a particular bucket. In other words, the bot traffic detection system 122 may group possible values of a feature into buckets.

Quantizing feature values may be particularly useful for non-categorical features or continuous features. For example, with respect to the time a session begins, the bot traffic detection system 122 may group the times by hour of day. As a result, all possible times for the time feature may fall within one of 24 different buckets. Analyzing 24 different buckets for the time feature may provide much more meaningful results than trying to analyze the time feature with continuous feature values.

Quantizing may also be done on categorical features. For example, a particular browser may have 500 different versions. The bot traffic detection system 122 may group the 500 different versions into 100 buckets such that every version of the browser would fall into one of the 100 buckets.

The bot traffic detection system 122 may create bucket sets that do not cover every possible value of a feature. In other words, the bot traffic detection system 122 may categorize values for a feature in a way that does not cover every possible value for a feature. For example, the bot traffic detection system 122 may create a bucket set for a feature that covers 95% of possible values for the feature.

The bot traffic detection system 122 may use a number of buckets for a feature and a range of values for each bucket that allow for a reasonable number of buckets with a substantive amount of data in each bucket. Having buckets that do not include a substantive amount of data may make it difficult or impossible to measure a distribution for the bucket that has any significance.

The bot traffic detection system 122 may create or receive a set of conditional independence relationships 126. The set of conditional independence relationships 126 may describe a set of features that, within a subset of the data 124, are each independent of a particular feature. One example of a conditional independence relationship may be as follows: conditioned on data being drawn from sessions involving a particular browser family, the browser version of the sessions is independent of the state from which the traffic originated, the country from which the traffic originated, the city from which the traffic originated, the ASN, the fonts count, and the number of network hops. The set of conditional independence relationships 126 may hold only for clean traffic.

Creating the set of conditional independence relationships 126 may include generating feature pairs and testing independence between the feature pairs. The feature pairs may be selected using prior knowledge or intuition. The bot traffic detection system 122 may use clean buckets to verify whether the proposed conditional independence relationships hold. Features may be removed and added based on verification results. Multiple iterations of verifying and modifying potential conditional independence relationships may be used to generate the set of conditional independence relationships 126.

The bot traffic detection system 122 may use the data 124 to identify clean buckets 128 for one or more features. A clean bucket may be a bucket that does not include bot traffic. A clean bucket may be a bucket that comprises mostly human traffic. A clean bucket may be a bucket that satisfies a test applied by the bot traffic detection system 122 for identifying clean buckets (described below). The bot traffic detection system 122 may use the set of conditional independence relationships 126 to identify the clean buckets 128. The bot traffic detection system 122 may attempt to identify clean buckets 128 from features that the set of conditional independence relationships 126 show are independent of each other for a given subset of the data 124.

To identify the clean buckets 128 the bot traffic detection system 122 may look for two or more uncorrelated feature buckets that have a sufficiently similar distribution on an independent feature. The two or more uncorrelated feature buckets may have substantial traffic. Discovering two or more uncorrelated feature buckets that fit such a description may give the bot traffic detection system 122 high confidence that the two or more uncorrelated feature buckets include mostly human traffic and not bot traffic. For example, assume that for two particular cities in the US, the bot traffic detection system 122 observes identical browser version distributions. Or assume that for a particular ASN and a particular network hop count, the bot traffic detection system 122 observes identical browser version distributions. These observations may give the bot traffic detection system 122 high confidence that within these feature buckets, the traffic mostly comes from humans and not bots because it may be difficult for the bots to mimic the same distribution across these unrelated feature combinations. It may be that bot traffic is not evenly spread across all feature buckets and that some feature buckets may have little or no bot traffic.

The bot traffic detection system 122 may have high confidence that two or more uncorrelated feature buckets include mostly human traffic and not bot traffic in part based on the differences between how human activity impacts a distribution and how bot activity impacts a distribution. Human behavior may generally be the same such that adding more human traffic does not change the distributions. But bot traffic may be incremental such that adding bot traffic may change the distributions. For example, consider a distribution of traffic arriving by hour of day in Seattle. The traffic arriving at 3 p.m. may be much higher than traffic at 3 a.m. That distribution may be the product of millions of people. To change that distribution of arrival for humans, the behavior of millions of people would need to change. In contrast, bot traffic can be changed easily. based on certain observations or assumptions about bot traffic.

The bot traffic detection system 122 may have high confidence that two or more uncorrelated feature buckets include mostly human traffic and not bot traffic in part because bots may not know what specific features the bot traffic detection system 122 is tracking or the specific features included in the set of conditional independence relationships 126. Thus, the bots may not be able to target the specific features of interest to the bot traffic detection system 122. And even if the bots know the specific features the bot traffic detection system 122 is analyzing, the bots may not be able to evaluate the distribution of traffic among those feature values. And even if the bots know the distributions, it will be difficult for the bots to distribute their traffic in the same way as the traffic is distributed in the clean buckets 128.

Consider the following example of the bot traffic detection system 122 identifying clean buckets. Assume that the set of conditional independence relationships 126 includes the following conditional independence relationship: browser version of a browser is independent of different cities conditioned on the browser version belonging to a same browser family. Assume the conditional independence relationship holds for clean buckets, i.e., for cities that are mostly human traffic. Assume that the set of conditional independence relationships 126 also includes the following conditional independence relationship: browser version distribution is independent of network hop counts in clean buckets conditioned on the browser version being within the same browser family. If the bot traffic detection system 122 finds different buckets within different cities or within different network hop counts that show similar distributions of browser version within the same browser family (such as within the Chrome browser family), then the bot traffic detection system 122 may determine that all those cities and network hop counts are clean buckets.

Figure 2:
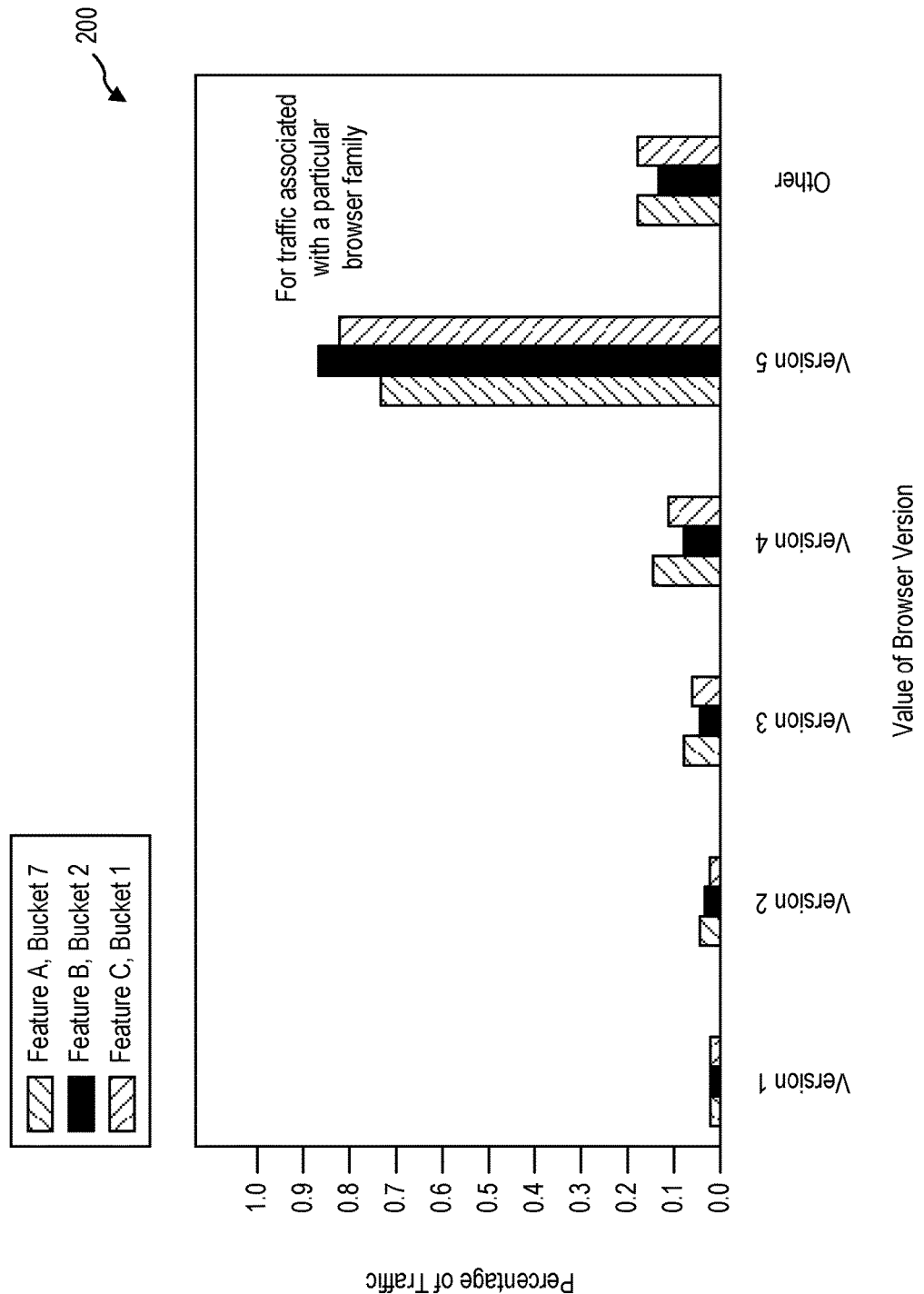
FIG. 2 illustrates an example set of distributions of clean buckets.

One way the bot traffic detection system 122 may identify the clean buckets 128 may include systematically analyzing the data 124 (with quantized features) using each conditional independence relationship in the set of conditional independence relationships 126. Assume that for traffic coming from a particular country, a first feature (such as browser user agent languages) is independent of a second feature (such as ASN), a third feature (such as state), a fourth feature (such as city), and a fifth feature (such as network hop count). As a first step, the bot traffic detection system 122 may select a first country (such as the United States). As a second step, the bot traffic detection system 122 may, for traffic originating from the first country, find among all buckets of the second feature those buckets with the most similar distributions on the first feature. The bot traffic detection system 122 may use Kullback-Leibler divergence to determine a similarity of two distributions and a set threshold level to determine whether the two distributions are sufficiently similar. As a third step, the bot traffic detection system 122 may repeat the second step for the first country with buckets from the third feature, the fourth feature, and the fifth feature. The bot traffic detection system 122 may then repeat the second step and the third step for all countries. The bot traffic detection system 122 may plot conditional feature distributions among matching feature buckets (across different features) to allow for validation of feature distribution matching performance and for confirming that feature independence holds. An example of such a plot is shown in FIG. 2.

The bot traffic detection system 122 may estimate clean distributions 130. A clean distribution may be a distribution for a feature or a set of features assuming the traffic is all human. The clean distributions 130 may include one or more clean distributions. The clean distributions 130 may include clean distributions for one or more features. The clean distributions 130 may include clean distributions for one or more combinations of features. Features in the one or more combinations of features may be independent of each other. The bot traffic detection system 122 may estimate a clean distribution for a feature or a set of features conditioned on traffic belonging to a particular subset of the data 124. In other words, the bot traffic detection system 122 may estimate clean distributions for a feature $x_k$ conditioned on $S_i$. For example, the bot traffic detection system 122 may estimate a clean distribution for a browser user agent languages feature conditioned on the traffic coming from a specific country, such as the United States.

The bot traffic detection system 122 may estimate the clean distributions 130 using the clean buckets 128. The bot traffic detection system 122 may estimate a clean distribution for a feature conditioned on a subset of the data 124 by determining a median of distributions of clean buckets for the feature conditioned on the subset of the data 124. The bot traffic detection system 122 may estimate a clean distribution for a combination of independent features by computing a product of the clean distributions of each feature in the combination of independent features.

The bot traffic detection system 122 may use the set of conditional independence relationships 126 to determine the clean distributions 130. A conditional independence relationship may take the following form: (an independent feature, a subset feature): [a first feature, a second feature, a third feature, a fourth feature]. The conditional independence relation may be read as follows: conditioned on the subset feature, the independent feature is independent of the first feature, the second feature, the third feature, or the fourth feature. The bot traffic detection system 122 may determine a clean distribution for the independent feature of each conditional independence relationship in the set of conditional independence relationships 126. To do so the bot traffic detection system 122 may, for each conditional independence relationship in the set of conditional independence relationships 126, perform two steps. In a first step, the bot traffic detection system 122 may determine, using data from a first bucket of the subset feature, an empirical distribution of P(the independent feature|the first bucket of the subset feature) for each of the clean buckets 128. In a second step, the bot traffic detection system 122 may estimate the clean distribution of P(the independent feature|the first bucket of the subset feature) as the median of all empirical distributions from the first step. The bot traffic detection system 122 may not estimate a clean distribution for a particular independent feature conditioned on a particular subset feature if the particular independent feature does not include any clean buckets conditioned on the particular subset feature.

As one example, consider the set of conditional independence relationships 126 includes the following conditional independence relationship: (browser user agent languages, country): [ASN, state, city, network hops]. The available country values may be United States, Canada, and Mexico. The bot traffic detection system 122 may begin with the United States. The bot traffic detection system 122 may determine an empirical distribution for each clean bucket of the browser user agent languages feature conditioned on the United States. The bot traffic detection system 122 may then estimate that the clean distribution of browser user agent languages conditioned on the United States is a median of all those empirical distributions. The bot traffic detection system 122 may then move to Canada as a value for the country feature. The bot traffic detection system 122 may determine, however, that the browser user agent languages feature conditioned on Canada does not include any clean buckets. As a result, the bot traffic detection system 122 may not determine a clean distribution for the browser user agent languages feature conditioned on Canada. The bot traffic detection system 122 may then move to Mexico as a value for the country feature. The bot traffic detection system 122 may determine an empirical distribution for each clean bucket of the browser user agent languages feature conditioned on Mexico. The bot traffic detection system 122 may then estimate that the clean distribution of browser user agent languages conditioned on Mexico is a median of all those empirical distributions.

The bot traffic detection system 122 may compute a rules table 132 for real-time scoring. The rules table 132 may include measures of a likelihood that a particular combination of feature values is bot traffic. The rules table 132 may be organized by columns. Each column may be a feature. Each row may represent a different combination of feature buckets or feature values. Each row may have an associated score representing a likelihood that a combination of feature buckets or feature values represented by the row is bot traffic. The scores may be normalized. The bot traffic detection system 122 may dynamically update the scores of the rules table 132 based on updates to the data 124. Updates to the data 124 may result from adding information for more sessions to the data 124.

One way the bot traffic detection system 122 may populate the rules table 132 is by calculating odds ratios. The odds ratios may be used to determine the scores associated with each row in the rules table 132. The bot traffic detection system 122 may estimate an odds ratio of each feature bucket against the clean ones as follows:

$$\frac{P(Bot \mid x, y, z)}{P(Clean \mid x, y, z)} = \frac{(Observed(x, y, z) - \alpha\ Clean(x, y, z))}{\alpha\ Clean(x, y, z)}$$

A higher odds ratio may represent a higher likelihood that this feature bucket combination is mostly bot. A default or estimated value may be used for $\alpha$ (e.g., $\alpha$=0.5).

The variables x, y, z may be different feature buckets. For example, x may be a certain city, y may be a certain browser version, and z may be a certain number of network hops. Clean(x,y,z) may be estimated using the clean distributions 130 and may represent a portion of a clean distribution corresponding to a particular combination of feature buckets. With feature independence within clean buckets, the following holds:

$$P(Clean \mid x,y,z) = P(Clean \mid x) \cdot P(Clean \mid y) \cdot P(Clean \mid z).$$

Where x, y, and z belong to independent features, Clean (x,y,z) may be estimated by multiplying clean distributions for x, y, and z. The clean distributions for x, y, and z may be conditioned on one or more subset feature buckets. For example, the first distribution may be a clean distribution of feature bucket x conditioned on a first feature bucket and a second feature bucket; the second distribution may be a clean distribution of feature bucket y conditioned on the second feature bucket; and the third distribution may be a clean distribution of feature bucket z conditioned on the first feature bucket. Assume that x is Redmond (a particular bucket of the city feature), y is version 7.9 of Chrome (a particular bucket of the browser version feature), and z is network hops of 18 (a particular bucket of the network hops feature). Assume that the first feature bucket is the United States (a particular bucket of the country feature) and the second feature bucket is Chrome (a particular bucket of the browser family feature). The bot traffic detection system 122 may estimate Clean(x,y,z) by multiplying a clean distribution of Redmond conditioned on the United States and Chrome, a clean distribution of version 7.9 of Chrome conditioned on Chrome, and a clean distribution of network hops of 18 conditioned on the United States.

Observed(x,y,z) may be estimated based on observed traffic conditioned on one or more subset feature buckets. Observed(x,y,z) may be estimated by determining traffic that fits within feature bucket x, feature bucket y, and feature bucket z and dividing that amount of traffic by total traffic from the one or more subset features. For example, assume that x is Redmond (a particular bucket of the city feature), y is version 7.9 of Chrome (a particular bucket of the browser version feature), and z is network hops of 18 (a particular bucket of the network hops feature). Assume that the one or more subset features are the United States (a particular bucket of the country feature) and Chrome (a particular bucket of the browser family feature). The bot traffic detection system 122 may determine a total amount of traffic that comes from Redmond and from version 7.9 of Chrome and travelled 18 network hops. It may then divide that amount by the total traffic coming from the United States and from a Chrome browser.

The variable $\alpha$ may be a percentage of the traffic that is coming from humans within a feature bucket. One minus $\alpha$ is a volume of traffic coming from bots. It may be possible to estimate $\alpha$. But it may be difficult to get a numerically stable value. Selecting any value of alpha between 0 and 1 may not change a relative ordering of estimates of the odds ratio. The bot traffic detection system 122 may use a value of alpha such as 0.5 or 0.7 and just leave it fixed. If the figure for $\alpha$ is higher than an actual percentage of bot traffic, then the odds ratio may overestimate a likelihood that any particular bucket is bot traffic but the relative ordering of odds ratios may be unaffected.

Although the examples above assume use of three feature buckets, fewer or more feature buckets may be used. Increasing a number of feature buckets may result in better differentiation between bots and clean buckets. But increasing the number of feature buckets may be difficult because the different features may need to be conditionally independent. Without conditional independence, it may be difficult to estimate the odds ratio. In other words, determining Clean(x, y, z) may be much harder if there is a correlation between x, y, or z. If x, y, z are independent, estimating Clean(x,y,z) may be done by determining Clean(x), Clean (y), and Clean(z) separately and then multiplying them together. The features used for x, y, and z may be chosen because they provide a good tradeoff between separation between bot and clean traffic while maintaining feature independence.

The bot traffic detection system 122 may use the rules table 132 for real-time scoring of traffic. The bot traffic detection system 122 may receive feature information for a session (such as the session 104a). The bot traffic detection system 122 may identify a score in the rules table 132 to associate with the session. The bot traffic detection system 122 may identify the score based on one or more feature values or buckets of the session. The bot traffic detection system 122 may include a score threshold. The bot traffic detection system 122 may compare the score associated with the session to the score threshold. The bot traffic detection system 122 may determine whether the session is bot traffic based on the comparison between the score associated with the session and the score threshold. For example, the bot traffic detection system 122 may determine that the session is bot traffic if the score associated with the session is greater than or equal to the score threshold and determine that the session is human traffic if the score associated with the session is less than the score threshold. The score threshold may determine a percentage of traffic that the bot traffic detection system will consider to be bot traffic.

The bot traffic detection system 122 may reject traffic that the bot traffic detection system 122 determines to be bot traffic.

FIG. 2 illustrates example distributions 200 of three clean buckets across browser versions for traffic associated with a particular browser family. The bot traffic detection system 122 may have identified the three clean buckets. The bot traffic detection system 122 may generate the example distribution. The browser version may include six values or buckets for the particular browser family: Version 1, Version 2, Version 3, Version 4, Version 5, and Other. The three clean buckets may be Bucket 7 of Feature A, Bucket 2 of Feature B, and Bucket 1 of Feature C. By way of example, Feature A may be a state of origin of a session and bucket 7 may be Texas. Feature B may be ASN and Bucket 2 may be 10796. Feature C may be a number of network hops associated with the session and Bucket 1 may be 18. The particular browser family may be Edge.

Explaining the meaning of the bars associated with Version 1 may illustrate the meaning of the bars shown in FIG. 1. For Version 1, the bar for Feature A, Bucket 7 may represent a percentage of total traffic associated with the particular browser family that had a browser version feature value of Version 1 and fell within Bucket 7 of feature A. Using the example buckets above, the bar for Feature A, Bucket 7 may represent a percentage of total traffic associated with Edge that had a browser version of Version 1 and came from Texas. For version 1, the bar for Feature B, Bucket 2 may represent a percentage of total traffic associated with the particular browser family that had a browser version feature value of version 1 and fell within Bucket 2 of Feature B. Using the example buckets above, the bar for Feature B, Bucket 2 may represent a percentage of total traffic associated with Edge that had a browser version of Version 1 and had an ASN of 10796. For Version 1, the bar for Feature C, Bucket 1 may represent a percentage of total traffic associated with the particular browser family that had a browser version feature value of Version 1 and fell within Bucket 1 of Feature C. Using the example buckets above, the bar for Feature C, Bucket 1 may represent a percentage of total traffic associated with Edge that had a browser version of Version 1 and had 18 network hops.

Observing the similarity of the three distributions shown in FIG. 2 may confirm that the three buckets are clean buckets.

Figure 3:
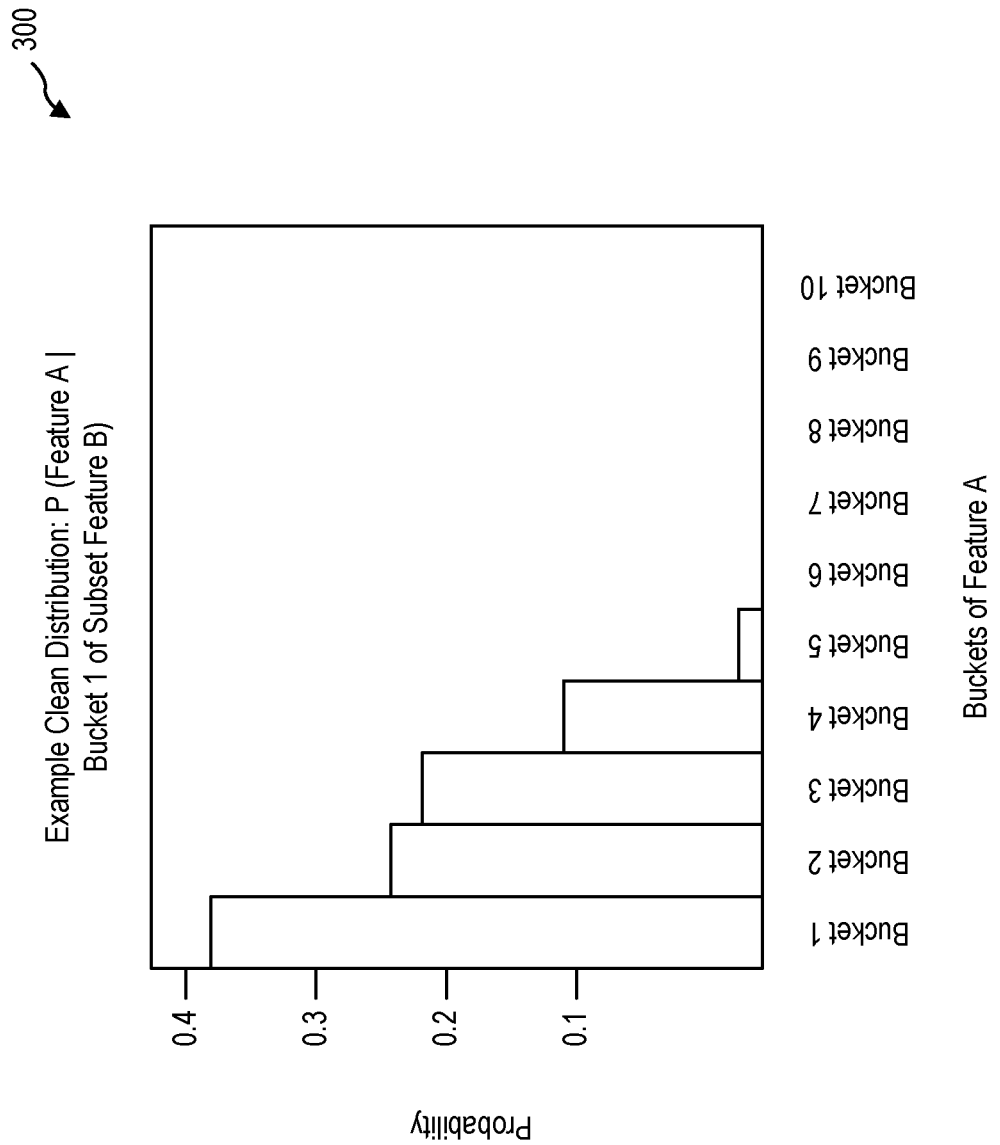
FIG. 3 illustrates an example clean distribution for a feature.

FIG. 3 may illustrate an example clean distribution 300 for Feature A conditioned on traffic coming from Bucket 1 of Subset Feature B. By way of example, Feature A may be browser user agent languages. Subset Feature B may be country. And Bucket 1 of Subset Feature B may be the United States. The bar shown above Bucket 1 in the clean distribution 300 may represent a probability that for traffic falling in Bucket 1 of Subset Feature B (which may be traffic from the United States), the traffic falls in Bucket 1 of Feature A. The bar shown above Bucket 2 in the clean distribution 300 may represent a probability that for traffic falling in Bucket 1 of Subset Feature B, the traffic falls in Bucket 2 of Feature A. The bar shown above Bucket 3 in the clean distribution 300 may represent a probability that for traffic falling in Bucket 1 of Subset Feature B, the traffic falls in Bucket 3 of Feature A. The bar shown above Bucket 4 in the clean distribution 300 may represent a probability that for traffic falling in Bucket 1 of Subset Feature B, the traffic falls in Bucket 4 of Feature A. The bar shown above Bucket 5 in the clean distribution 300 may represent a probability that for traffic falling in Bucket 1 of Subset Feature B, the traffic falls in Bucket 5 of Feature A.

Figure 4:
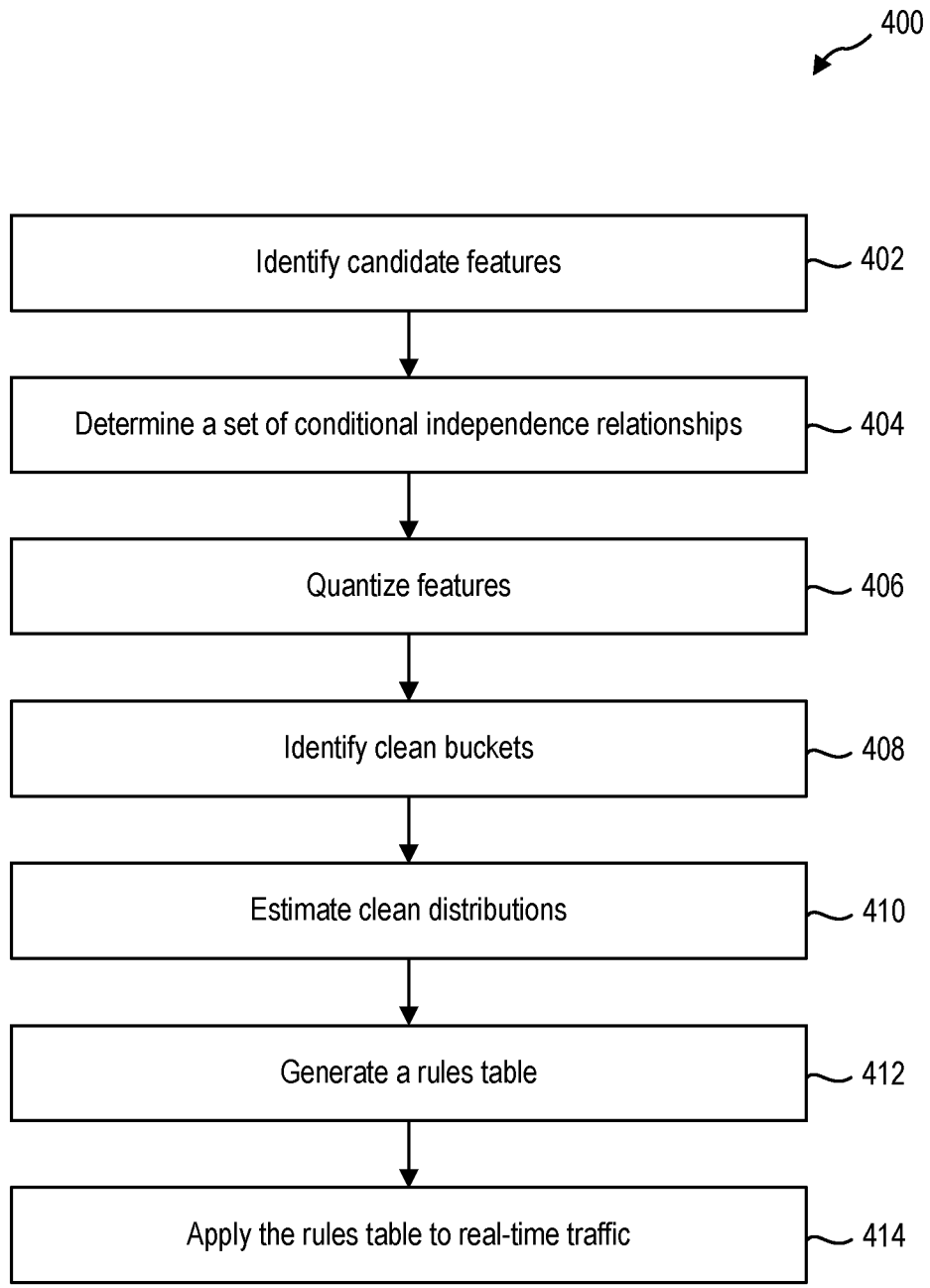
FIG. 4 illustrates an example method for detecting scripted network traffic.

FIG. 4 may illustrate an example method 400 for detecting bot traffic.

The method 400 may include identifying 402 candidate features. Browser sessions and network traffic may have a large set of features. Identifying 402 the candidate features may include collecting values for only a subset of the large set of features. The candidate features may be device fingerprinting features. The candidate features may be used for identifying clean buckets. The candidate features may be used for generating a rules table. The candidate features may be device fingerprinting features. The candidate features may include geolocation information (such as an origin city, state, or ASN). The candidate features may include browser information (such as browser version, browser family, fonts count, or list of user languages). The candidate features may include network information (such as network hops). The candidate features may include session information (such as a local time for a session). Identifying 402 the candidate features may include identifying features from the large set of features that keep latency at a minimum. Identifying 402 the candidate features may include identifying features from the large set of features that maintain independence between and among the candidate features.

The method 400 may include determining 404 a set of conditional independence relationships. A conditional independence relationship may apply to clean buckets. A conditional independence relationship may describe a first feature that, conditioned on a subset feature, is independent of one or more features. For example, conditioned on traffic being from a particular browser family, the browser version of the traffic is independent of the state, country, city, ASN, fonts count, or network hops of the traffic. As another example, conditioned on traffic being from a particular country, the browser user agent languages of the traffic may be independent of the ASN, state, city, or network hops of the traffic. As another example, conditioned on traffic being from a particular country, the state of the traffic may be independent of the browser version, browser family, or network hops of the traffic. As another example, conditioned on the traffic being from a particular country, the network hops of the traffic may be independent of the browser version and the browser family of the traffic.

Determining 404 the set of conditional independence relationships may include accessing a set of conditional independence relationships.

The method 400 may include quantizing 406 features. Quantizing 406 the features may include categorizing or grouping values for the features into buckets or bins. Some of the features may come with natural categories. For example, if traffic is labeled with source state, the state is a natural category. But for time of day, categorizing feature values into buckets of hours of day may facilitate analyzing the time of day feature as compared to keeping the time of day in milliseconds. Similarly, the estimated longitude and latitude of an IP address may be too wide or too rich in the input space. As a result, it may be useful to categorize the longitude and latitude according to an associated city.

Quantizing 406 the features may include determining a number of buckets for each feature. Buckets that do not include a sufficient amount of data may not be useful. Determining the number of buckets for each feature may include determining a reasonable number of buckets that all include at least some data. Without sufficient data in each bucket, it may be difficult or impossible to measure distributions with any significance.

The method 400 may include identifying 408 clean buckets. Identifying 408 the clean buckets may include identifying buckets that have sufficiently similar distributions. Two or more distributions may be sufficiently similar if a particular divergence measure (such as the Kullback-Leibler divergence) meets a particular threshold. Identifying 408 the clean buckets may include going through each conditional independence relationship in the set of conditional independence relationships to identify all the buckets that have matching feature distributions. Identifying buckets that have matching feature distributions may include measuring a distance between pairs of feature distributions and finding ones with a distance below a set threshold. The buckets that have matching feature distributions may be identified as the clean buckets.

The method 400 may include estimating 410 clean distributions. A clean distribution may be a distribution of human traffic that does not include bot traffic. Estimating 410 the clean distributions may include estimating a clean distribution for a feature based on the clean buckets identified for the feature. For example, a clean distribution for a feature may be a median of distributions of each clean bucket identified for the feature. Estimating 410 the clean distributions may include estimating a clean distribution for a set of independent features based on clean distributions of the set of independent features. For example, a clean distribution for a set of independent features may be the product of the distributions of the set of independent features. The clean distributions may be conditioned on a subset feature having a particular value or bucket.

The method 400 may include generating 412 a rules table. Generating 412 the rules table may include calculating odds ratios for one or more feature combinations based on the clean distributions and observed distributions of observed traffic. The rules table may include scores for one or more feature combinations. The scores may indicate a likelihood that traffic having a particular feature combination is bot traffic. The scores may be based on the odds ratios.

The method 400 may include applying 414 the rules table to real-time traffic. The real-time traffic may include a session. Applying 414 the rules table to the session may include determining buckets or values for features of the session. The buckets or values for features of the session may be used to identify an applicable or matching row or entry in the rules table. The applicable or matching row or entry may have an associated score. Applying 414 the rules table to the session may include comparing the associated score to a threshold score. Applying 414 the rules table to the session may include determining whether the session is bot traffic based on comparing the associated score to the threshold score.

Figure 5:
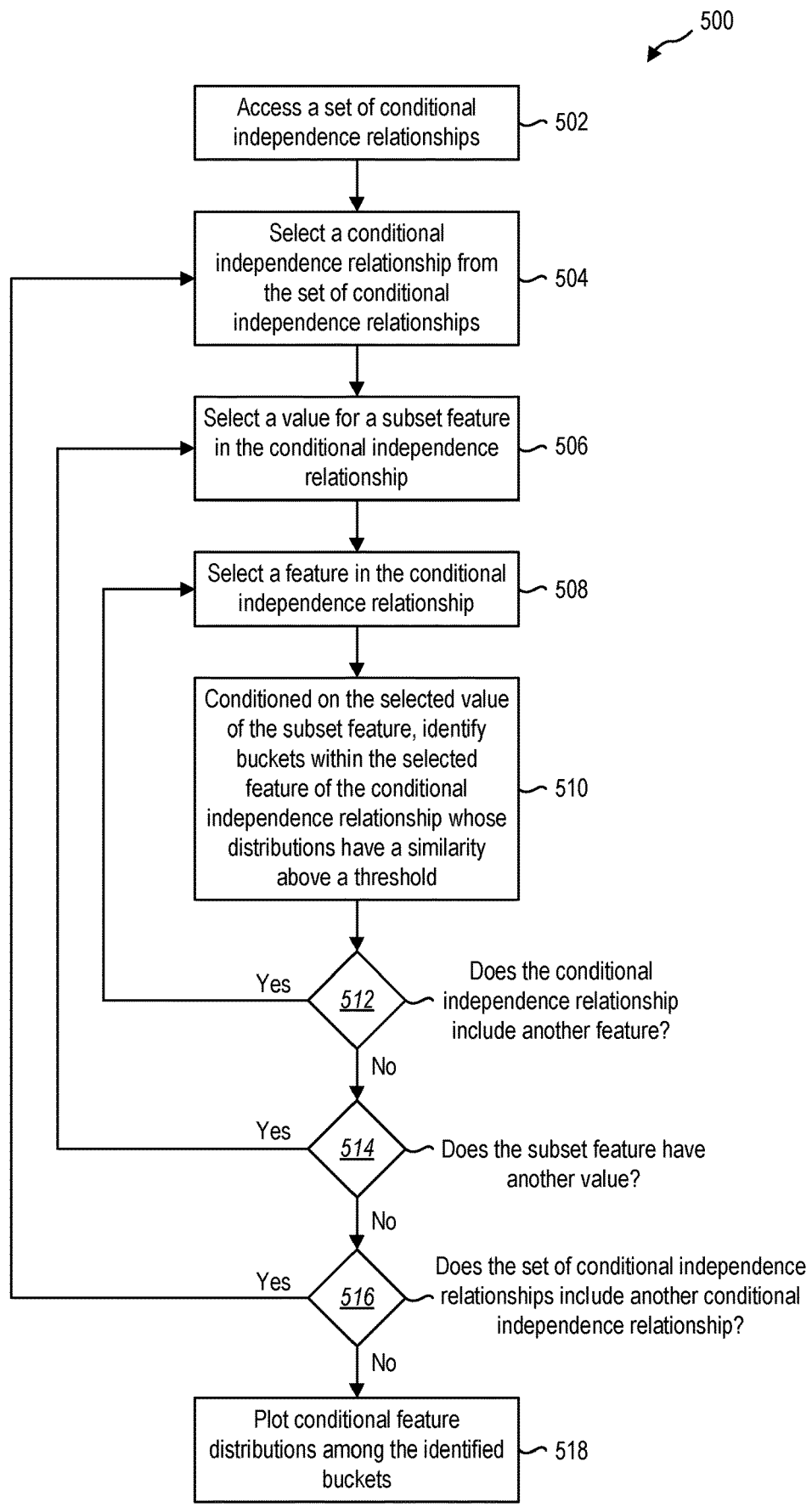
FIG. 5 illustrates an example method for identifying clean buckets.

FIG. 5 illustrates an example method 500 for identifying clean buckets.

The method 500 may include accessing 502 a set of conditional independence relationships. The set of conditional independence relationships may include one or more conditional independence relationships.

The method 500 may include selecting 504 a conditional independence relationship from the set of conditional independence relationships. A conditional independence relationship may take the following form: (an independent feature, a subset feature): [a first feature, a second feature, a third feature, a fourth feature]. The conditional independence relation may be read as follows: conditioned on network traffic data being restricted to sessions that have a particular value of the subset feature, the independent feature is independent of the first feature, the second feature, the third feature, or the fourth feature.

The method 500 may include selecting 506 a value for a subset feature in the conditional independence relationship. The subset feature may have one or more possible values. The subset feature may have one or more buckets and the one or more possible values may be the one or more buckets. Selecting 506 the value for the subset feature may be a means for selecting a subset of available network traffic data. The subset feature may be identified in the selected conditional independence relationship.

The method 500 may include selecting 508 a feature in the conditional independence relationships. The feature may be any of the features shown as independent of the independent feature in the conditional independence relationship. For example, selecting 508 selecting the feature may include selecting the first feature.

The method 500 may include conditioned on the selected value of the subset feature, identifying 510 buckets within the selected feature of the conditional independence relationship whose distributions have a similarity above a threshold. Determining whether the similarity is above the threshold may include determining a Kullback-Leibler divergence for distributions and comparing the Kullback-Leibler divergence to a defined threshold.

The method 500 may include determining 512 whether the conditional independence relationship includes another feature.

If the conditional independence relationship includes another feature, the method 500 may include selecting 508 another feature in the conditional independence relationship. In other words, the method 500 may include repeating step 510 for each feature that is independent of the independent feature in the selected conditional independence relationship.

If the conditional independence relationship does not include another feature, the method 500 may include determining 514 whether the subset feature has another value.

If the subset feature does have another value, the method 500 may include selecting 506 another value for the subset feature. In other words, the method 500 may include repeating steps 508 and 510 for each value of the subset feature.

If the subset feature does not have another value, the method 500 may include determining 516 whether the set of conditional independence relationships include another conditional independence relationship.

If the set of conditional independence relationships includes another conditional independence relationship, the method 500 may include selecting 504 another conditional independence relationship from the set of conditional independence relationships. In other words, the method 500 may include repeating steps 506, 508, and 510 for each conditional independence relationship in the set of conditional independence relationships.

If the set of conditional independence relationships does not include another conditional independence relationship, the method 500 may include plotting 518 conditional feature distributions among the identified buckets.

Figure 6:
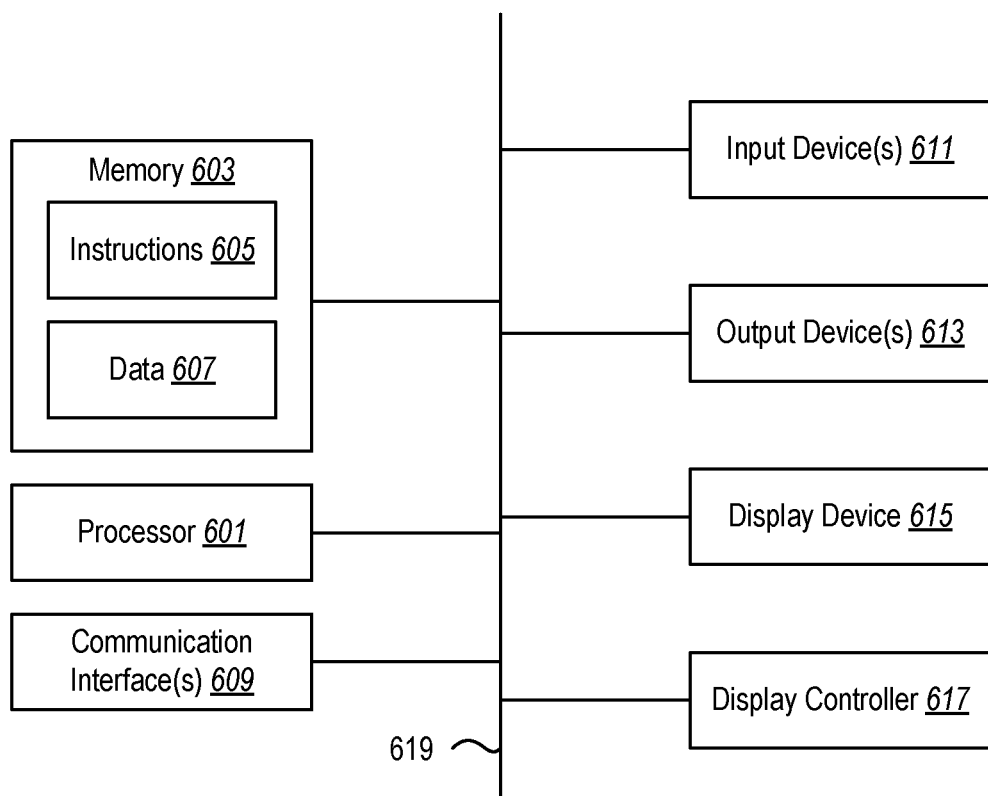
FIG. 6 illustrates certain components that may be included in a computing system.

Reference is now made to FIG. 6. One or more computing devices 600 can be used to implement at least some aspects of the techniques disclosed herein. FIG. 6 illustrates certain components that can be included within a computing device 600.

The computing device 600 includes a processor 601 and memory 603 in electronic communication with the processor 601. Instructions 605 and data 607 can be stored in the memory 603. The instructions 605 can be executable by the processor 601 to implement some or all of the methods, steps, operations, actions, or other functionality that is disclosed herein. Executing the instructions 605 can involve the use of the data 607 that is stored in the memory 603. Unless otherwise specified, any of the various examples of modules and components described herein can be implemented, partially or wholly, as instructions 605 stored in memory 603 and executed by the processor 601. Any of the various examples of data described herein can be among the data 607 that is stored in memory 603 and used during execution of the instructions 605 by the processor 601.

Although just a single processor 601 is shown in the computing device 600 of FIG. 6, in an alternative configuration, a combination of processors (e.g., an ARM and DSP) could be used.

The computing device 600 can also include one or more communication interfaces 609 for communicating with other electronic devices. The communication interface(s) 609 can be based on wired communication technology, wireless communication technology, or both. Some examples of communication interfaces 609 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computing device 600 can also include one or more input devices 611 and one or more output devices 613. Some examples of input devices 611 include a keyboard, mouse, microphone, remote control device, button, joystick, trackball, touchpad, and lightpen. One specific type of output device 613 that is typically included in a computing device 600 is a display device 615. Display devices 615 used with embodiments disclosed herein can utilize any suitable image projection technology, such as liquid crystal display (LCD), light-emitting diode (LED), gas plasma, electroluminescence, wearable display, or the like. A display controller 617 can also be provided, for converting data 607 stored in the memory 603 into text, graphics, and/or moving images (as appropriate) shown on the display device 615. The computing device 600 can also include other types of output devices 613, such as a speaker, a printer, etc.

The various components of the computing device 600 can be coupled together by one or more buses, which can include a power bus, a control signal bus, a status signal bus, a data bus, etc. For the sake of clarity, the various buses are illustrated in FIG. 6 as a bus system 619.

The techniques disclosed herein can be implemented in hardware, software, firmware, or any combination thereof, unless specifically described as being implemented in a specific manner. Any features described as modules, components, or the like can also be implemented together in an integrated logic device or separately as discrete but interoperable logic devices. If implemented in software, the techniques can be realized at least in part by a non-transitory computer-readable medium having computer-executable instructions stored thereon that, when executed by at least one processor, perform some or all of the steps, operations, actions, or other functionality disclosed herein. The instructions can be organized into routines, programs, objects, components, data structures, etc., which can perform particular tasks and/or implement particular data types, and which can be combined or distributed as desired in various embodiments.

The term "processor" can refer to a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, or the like. A processor can be a central processing unit (CPU). In some embodiments, a combination of processors (e.g., an ARM and DSP) could be used to implement some or all of the techniques disclosed herein.

The term "memory" can refer to any electronic component capable of storing electronic information. For example, memory may be embodied as random access memory (RAM), read-only memory (ROM), magnetic disk storage media, optical storage media, flash memory devices in RAM, various types of storage class memory, on-board memory included with a processor, erasable programmable read-only memory (EPROM), electrically erasable programmable read-only memory (EEPROM) memory, registers, and so forth, including combinations thereof.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for detecting bot traffic, the method comprising:
accessing a set of conditional independence relationships, wherein a conditional independence relationship describes a set of features that are independent of a separate feature conditioned on a subset feature;
identifying clean buckets within network traffic data using the set of conditional independence relationships, wherein the network traffic data includes values for features of network traffic and the values for the features are categorized into buckets and wherein the identifying the clean buckets within the network traffic data using the set of conditional independence relationships comprises:
selecting a first conditional independence relationship from the set of conditional independence relationships;
selecting a value for a subset feature of the first conditional independence relationship;
selecting a feature from the set of features; and
conditioned on the value for the subset feature, identifying buckets within the feature whose distributions have a difference or divergence below a threshold;
determining clean distributions using the clean buckets; and
detecting the bot traffic based on the clean distributions.

2. The method of claim 1, further comprising: obtaining the values for the features of the network traffic through device fingerprinting.

3. The method of claim 2, wherein the features of the network traffic include geo-location information, session information, browser information, and network information.

4. The method of claim 3, wherein the features of the network traffic include one or more of a browser version, a browser family, a country, a state, a city, an autonomous system number, a session start time, a number of network hops, or browser user agent languages.

5. The method of claim 1, further comprising: determining the set of conditional independence relationships, wherein determining the set of conditional independence relationships comprises:
generating feature pairs; and
testing independence between the feature pairs.

6. The method of claim 1, further comprising: quantizing the values for the features of the network traffic.

7. The method of claim 1, wherein identifying the clean buckets within the network traffic data using the set of conditional independence relationships further comprises:
determining a similarity of two or more buckets within the feature using a divergence measure.

8. The method of claim 7, wherein the divergence measure is Kullback-Leibler divergence.

9. The method of claim 1, wherein determining the clean distributions using the clean buckets comprises:
determining, for each clean bucket of an independent feature of the first conditional independence relationship, a distribution of the independent feature conditioned on the value for the subset feature; and
determining a median of distributions determined for each clean bucket.

10. The method of claim 1, wherein detecting the bot traffic based on the clean distributions comprises:
determining odds ratios based on the clean distributions and observed network traffic;
generating a rules table based on the odds ratios;
identifying an entry in the rules table associated with a session, wherein the entry has an associated score; and
comparing the associated score to a threshold.

11. A system for detecting bot traffic, comprising:
one or more processors;
memory in electronic communication with the one or more processors;
data stored in the memory, the data including values for features of network traffic and the values for the features categorized into buckets; and
instructions stored in the memory, the instructions being executable by the one or more processors to:
access a set of conditional independence relationships, wherein a conditional independence relationship describes a set of features that are independent of a separate feature conditioned on a subset feature;
identify clean buckets within network traffic data using the set of conditional independence relationships, wherein the network traffic data includes values for features of network traffic and the values for the features are categorized into buckets;
determine clean distributions using the clean buckets, wherein determining the clean distributions using the clean buckets comprises:
select a first conditional independence relationship from the set of conditional independence relationships;
select a value for a subset feature of the first conditional independence relationship;
determine, for each clean bucket of an independent feature of the first conditional independence relationship, a distribution of the independent feature conditioned on the value for the subset feature; and
determine a median of distributions determined for each clean bucket; and
detect the bot traffic based on the clean distributions.

12. The system of claim 11, wherein the instructions stored in memory are executable by the one or more processors to: obtain the values for the features of the network traffic through device fingerprinting.

13. The system of claim 12, wherein the features of the network traffic include geo-location information, session information, browser information, and network information.

14. The system of claim 11, wherein the instructions stored in memory that are executable by the one or more processors to identify the clean buckets within the network traffic data using the set of conditional independence relationships are further executable by the one or more processors to:
select a second conditional independence relationship from the set of conditional independence relationships;
select a second value for a subset feature of the second conditional independence relationship;
select a feature from the set of features; and conditioned on the second value for the subset feature, identify buckets within the feature whose distributions have a similarity above a threshold.

15. The system of claim 14, wherein the similarity of two or more buckets within the feature is determined using a divergence measure.

16. The system of claim 11, wherein the instructions stored in memory that are executable by the one or more processors to detect the bot traffic based on the clean distributions are further executable by the one or more processors to:
determine odds ratios based on the clean distributions and observed network traffic;
generate a rules table based on the odds ratios;
identify an entry in the rules table associated with a session, wherein the entry has an associated score; and
compare the associated score to a threshold.

17. A non-transitory computer-readable medium comprising instructions that are executable by one or more processors to cause a computing system to:
select a conditional independence relationship from a set of conditional independence relationships, wherein the conditional independence relationship describes a set of features that, conditioned on a subset feature, are independent of a separate feature;
select a value for the subset feature;
select a feature from the set of features; and
conditioned on the value for the subset feature, identify buckets within the feature whose distributions have a similarity above a threshold;
determine clean distributions using the identified buckets; and
detect bot traffic based on the clean distributions.

18. The non-transitory computer-readable medium of claim 17, wherein the similarity of two or more buckets within the feature is determined using a divergence measure.

* * * * *